June 19, 1956  W. G. FASTIE  2,750,836
MONOCHROMATOR SYSTEM FOR SPECTROCHEMICAL ANALYSIS
Filed July 27, 1954  6 Sheets-Sheet 4

June 19, 1956 W. G. FASTIE 2,750,836
MONOCHROMATOR SYSTEM FOR SPECTROCHEMICAL ANALYSIS
Filed July 27, 1954 6 Sheets-Sheet 5

June 19, 1956  W. G. FASTIE  2,750,836
MONOCHROMATOR SYSTEM FOR SPECTROCHEMICAL ANALYSIS
Filed July 27, 1954  6 Sheets—Sheet 6

United States Patent Office 2,750,836
Patented June 19, 1956

2,750,836

MONOCHROMATOR SYSTEM FOR SPECTROCHEMICAL ANALYSIS

William G. Fastie, Owings Mills, Md., assignor to Leeds and Northrup Company, Philadelphia, Pa., a corporation of Pennsylvania Application July 27, 1954, Serial No. 446,106

17 Claims. (Cl. 88—14)

This invention relates to spectroscopy and has for an object the provision of a new and improved system for a monochromator useful for spectrochemical analysis. It is a principal object of the invention to provide a monochromator having an optical system which includes curved entrance and exit slits so related to other elements of the optical system of the monochromator as greatly to increase the available energy without loss of a high degree of resolution. This feature of the invention has utility in other symmetrical optical systems wherein point sources of radiant energy are projected by the optical system as line images.

This application is a continuation-in-part of my parent application Serial No. 241,194, filed August 10, 1951, and includes subject matter required by the Patent Office to be divided out of my parent application.

Various features of the present invention are applicable to the spectral systems of such instruments as the spectroscope, spectrometer, spectrograph, spectrophotometer, and the like, as will be understood after a detailed description of the features as applied to a monochromator, a device for isolating monochromatic energy, such as an emission line or a narrow band of continuous spectrum of radiant energy, from a light source. Most elements of a monochromator are generally included as a part of each of the foregoing types of instruments.

In accordance with the invention, the entrance and exist slits have a curvature such that the sum total of line images of points along the entrance slit form an arcuate image of the entrance slit at a correspondingly curved exit slit. In this manner there is avoided loss of resolution incident to use of linear entrance and exit slits of substantial length. By removing the limitation on slit length heretofore imposed upon systems using straight parallel slits in order to achieve high resolution, it is now possible to utilize arcuate slits of substantial length to increase the usable radiant energy without significant loss of resolution. Since the larger slit openings thus obtained pass more energy from the source of radiation, more energy of the required degree of spectral purity is available for measurement with resultant increase in signal-to-noise ratio, making possible greater accuracy of measurement of intensity of dispersed radiation.

More particularly, the invention in one form is applied to any optical system including reflecting means with a collimating element, and dispersing means, such as a grating, disposed for directing dispersed radiant energy to said reflecting means. The system also includes means for improving the spectral resolution of the system comprising structure defining a circularly curved slit for passage therethrough of radiant energy from a source to the dispersing means and structure defining a second circularly curved slit for receiving thereupon an image of the first-named slit formed of reflected and dispersed radiant energy from the source. The use of circular slits as mentioned is made desirable by the fact that optical systems of the type hereinafter to be described are such that a point on the entrance slit is imaged as a short straight line at the exit slit. In a preferred type of optical system, in which entrance and exit slits lie in the same plane, this plane being perpendicular to a central axis of the optical system, the line image of each point of an entrance slit located on one side of a circle is tangent to the same circle at its opposite side. The center of this circle is on the central axis of the optical system. Hence, by using the central axis of the optical system as a center and employing a convenient radius to locate a circular entrance slit of finite length, in the focal plane of the system, a group of point sources is delineated, the overlapping short straight line images of which are found diametrically opposite each point source. These individual images combine to produce a circular image of the entrance slit. In order to isolate this image a corresponding circular exit slit is employed.

The arcuate or curved apertures may comprise entrance and exit slits of an optical system, the slits being formed by inner and outer jaw members having curved edges. The jaw members are preferably so disposed as to provide for adjustment of the slit width. The slit width may be adjusted either unilaterally by moving either the inner or outer jaw members or bilaterally by moving both the inner and outer jaw members. It can be shown that if either the inner or outer jaw members are moved by equal amounts, change in mean wavelength transmitted may be minimized.

More specifically, in one form of the invention the adjustable width slit structure for an optical system may comprise a ring structure forming one jaw of each slit structure, a second jaw of each slit structure cooperating with the first jaw with micrometer positioning means associated with the ring structure for deforming the ring structure to move the first jaw of each slit relative to the second jaw for adjustment of slit widths.

For a more detailed disclosure of the invention and for further objects and advantages thereof, reference is to be had to the following description taken in conjunction with the following drawings in which.

Figure 1:
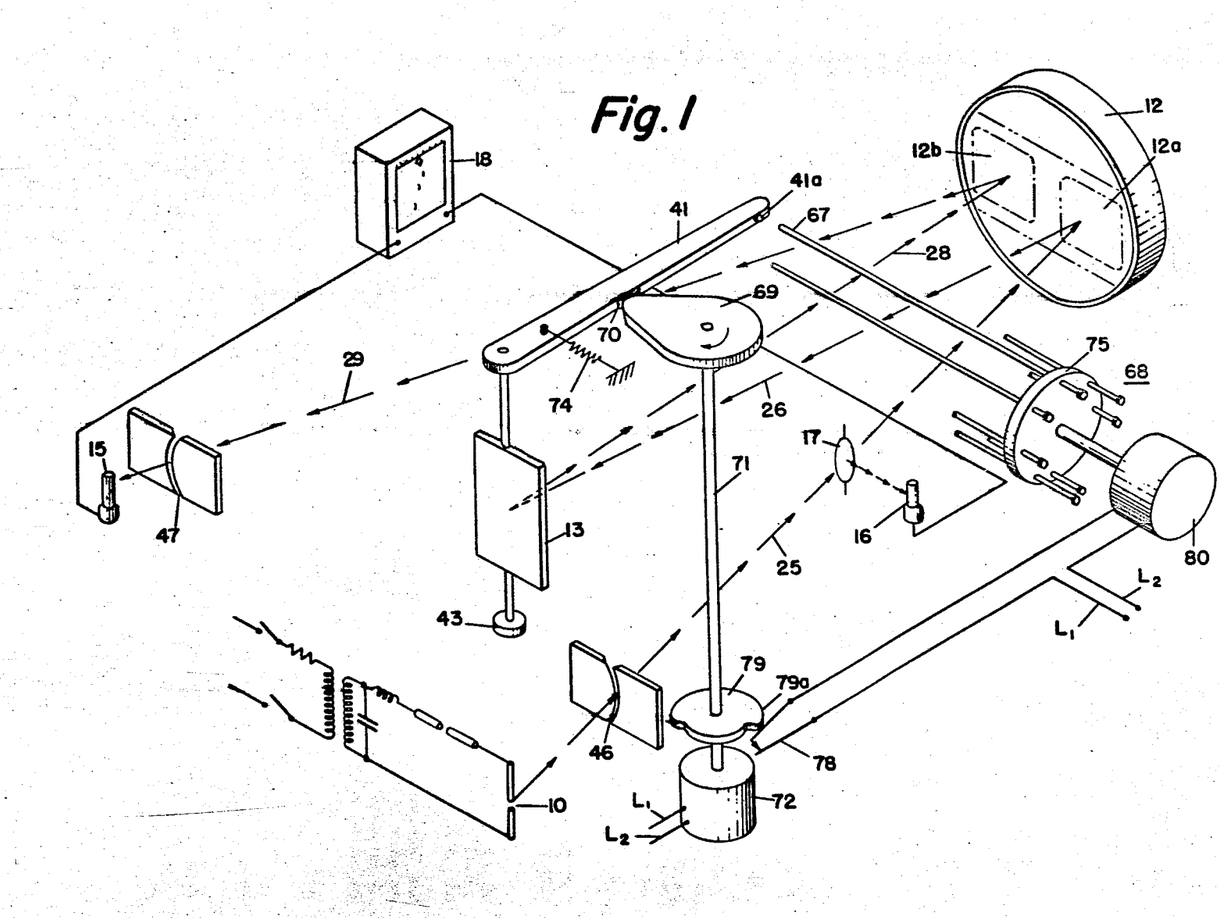
Fig. 1 diagrammatically illustrates in perspective a system for direct reading spectrochemical analysis including curved entrance and exit slit structure of the present invention.
Figure 2:
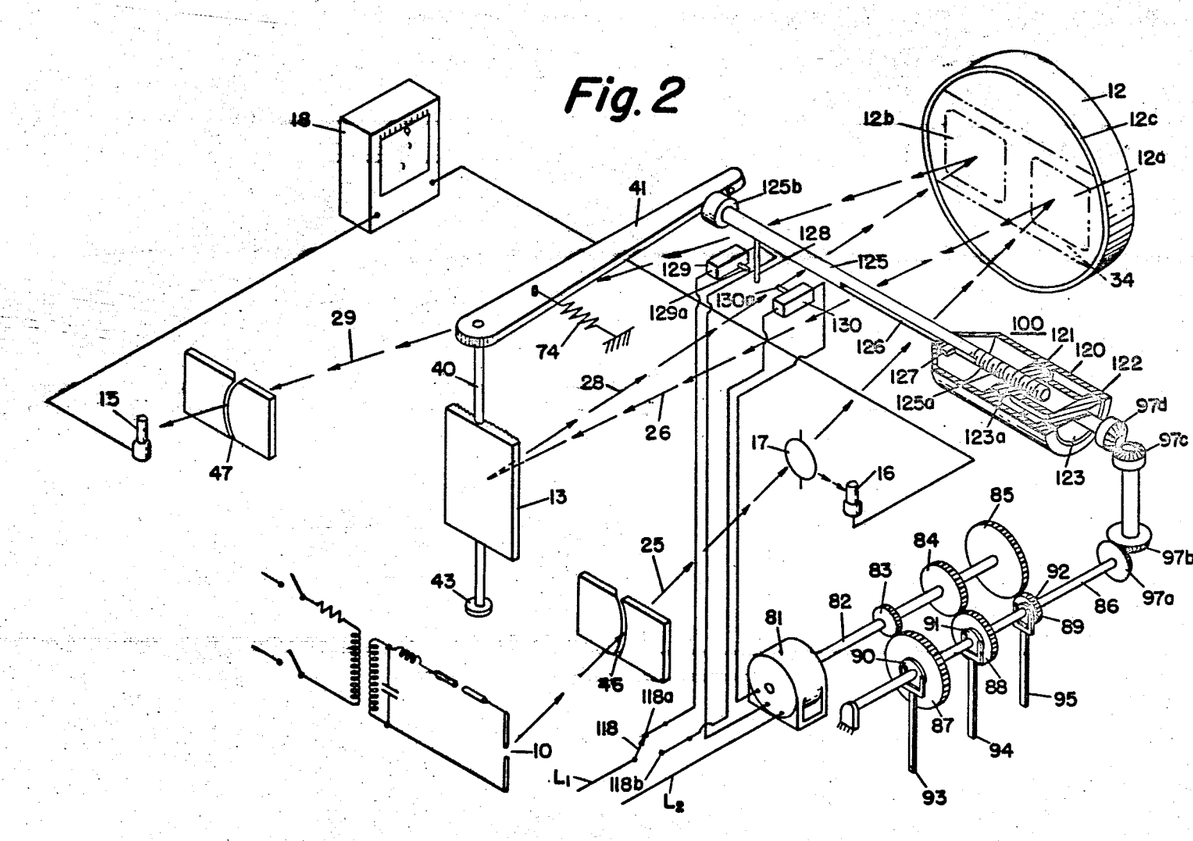
Fig. 2 diagrammatically illustrates in perspective a modification of the system of Fig. 1 for direct reading spectrochemical analysis including continuous scanning.

Referring to the drawings, there are shown diagrammatically in Figs. 1 and 2 spectrometer systems for direct reading spectrochemical analysis of emission spectra utilizing a ratio method of measurement. Radiant energy is produced by a spark or arc created in a gap 10 between a pair of electrodes made of a material to be analyzed. The monochromator system illustrated includes various features of the present invention. Each of the spectrometer systems is provided with a single stationary photo-sensitive element, for example, a photomultiplier tube for receiving the radiant energy emanating from the selected line or band of the spectrum. The shifting from one line or band of the spectrum to another may be accomplished by rotating the dispersing means either to predetermined fixed positions as shown in Fig. 1 by a step-by-step procedure or by continuous rotation of the dispersing means through a predetermined angle of revolution as shown in Fig. 2. Due to the rotation of the optical dispersing means it is not practicable to utilize a constituent line of the material to be analyzed for reference purposes. Accordingly, the reference employed for the ratio measurements preferably is a broad spectral region of the radiant energy from the source which is directed to a photosensitive element as described and claimed in U. S. Letters Patent No. 2,734,418, granted upon copending application Serial No. 156,763, filed April 19, 1950, by John H. Enns. Provision also may be made for eliminating errors in the ratio measurements which may arise because of wandering of the spark or arc over the surface of the electrodes by incorporating features set forth in copending application, Serial No. 241,258, filed August 10, 1951, by George C. Hill, Jr. Ratio measurements may be made by means of a ratio recorder, for example, of the type described and claimed in Williams Patent No. 2,522,976.

As shown in Figs. 1 and 2, the total radiation from a source 10 illustrated, for example, as an analytical gap 10, passes through an entrance slit 46 to a reflecting surface area 12a of a single concave spherical mirror 12. The radiation is collimated and reflected from the surface area 12a of mirror 12 to a spectral dispersing means 13 from which the radiation is redirected to a second reflecting surface area 12b of the mirror 12. The concave spherical surface area 12b redirects the radiant energy to form a spectrum in the plane of the exit slit 47. The slit passes energy of a selected line to a suitable radiation receiver 15 which has been illustrated as a photomultiplier tube. A portion of the radiation from source 10 passing through entrance slit 46 may be directed to a second photomultiplier tube 16 for a reference. As shown in Figs. 1 and 2, a transparent element 17 may be disposed within the path of radiant energy from entrance slit 46, a major part passing through the element 17 directly to reflecting surface 12a and a small part being reflected so as to be received by the radiation receiver 16. It is to be understood that other suitable means for directing a part of the radiant energy to the radiation receiver 16 may be utilized, such as disclosed in the aforementioned copending applications of John H. Enns and George C. Hill, Jr. The output of radiation receiver 16 may be used as a reference for receiver 15 and preferably radiation receivers 15 and 16 are both connected to a ratio recorder 18 for the purpose of recording the relative intensity of the selected line with respect to the reference.

Figure 3:
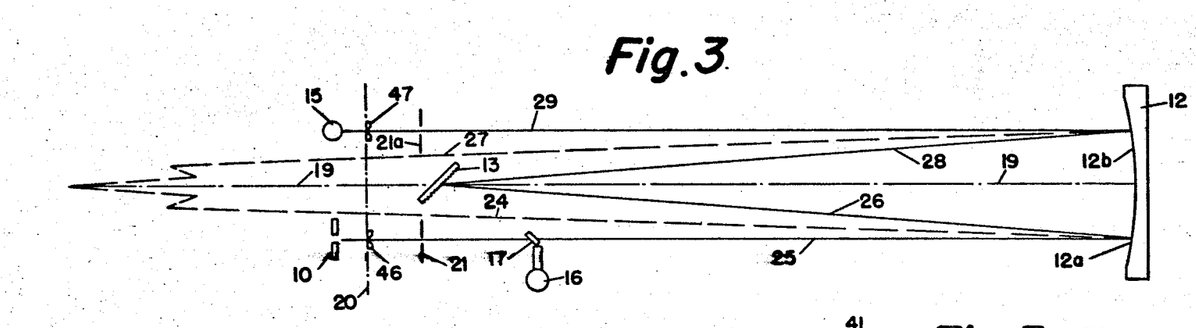
Fig. 3 is a ray diagram of the optical system shown in Figs. 1–2.

The relative positions of the various optical elements in the optical system of Figs. 1 and 2 may best be seen by reference to the ray diagram shown in Fig. 3. As may be seen, the single concave spherical mirror 12 provides a reflecting surface 12a to receive from entrance slit 46 radiation from source 10. The entrance slit 46 dipsosed to one side of the axis 19 of the mirror 12 directs a beam of radiant energy from source 10 to the area 12a. The energy is reflected from area 12a in parallel rays to dispersing means 13 of any suitable type, a plain reflection grating being illustrated. The grating 13, in face-to-face relationship with the concave mirror 12, is located along the axis 19 and has an angular position for directing dispersed radiant energy to a second reflecting surface 12b of the mirror. The concave spherical surface 12b redirects the radiant energy to produce sharply focused spectral lines in the plane of the exit slit 47 disposed on the opposite side of axis 19 in symmetrical relation with entrance slit 46, both slits being disposed in a common plane, the trace of which is indicated by line 20, Fig. 3, which plane is perpendicular to the axis 19.

Radiant energy passing through entrance slit 46, which is in the focal plane of the concave mirror 12, is converted by surface 12a into a beam of parallel rays directed upon the grating 13. Baffle structure 21 may be provided in the path of the entrance radiation to prevent undesirable radiant energy from passing to the mirror 12. Similarly, baffle structure 21a may be provided in the path of the exit radiation to prevent undesirable radiant energy from passing to the exit slit 47. If desired the baffle structures 21 and 21a each may comprise merely a single inner baffle member rather than the inner and outer members as illustrated in Fig. 3. The grating 13 spectrally disperses the radiant energy received thereby and redirects it to the concave spherical surface 12b which focuses the dispersed rays on the exit slit 47 which is also in the focal plane of the mirror 12. The slits 46 and 47 are equidistant from the mirror axis 19 which bisects the grating 13. By making the width of the exit slit 47 of a relatively small dimension, for example, of the order of five microns, only radiation in a narrow spectral region can pass through the slit.

In the reflection of the radiant energy by the concave spherical surface 12a, aberrations occur. Some aberrations also occur upon reflection of radiant energy from the surface of 12b. Advantage is taken of the fact that the aberrations incident to the reflection from the surfaces 12a and 12b are of equal magnitude and in opposite directions. Thus, the arrangement of the two reflecting surfaces of mirror 12 equidistant from the axis 19 provides a self-compensating system which reduces optical aberrations to a highly satisfactory minimum.

The symmetry of the system is such that a line 24 normal to the reflecting surface 12a bisects the angle between lines 25 and 26. The line 25 is representative of a radiant energy beam from the entrance slit 46, and the latter being in the focal plane of concave mirror 12, and is collimated by surface 12a into parallel rays, one of which has been illustrated as line 26 which strikes the center of the grating 13. Similarly, line 27 bisects the angle between corresponding lines 28 and 29. The line 28 is representative of dispersed radiant energy directed by the grating 13 to surface 12b, the latter redirecting the dispersed radiant energy, represented as line 29, and focusing it on exit slit 47 which similarly to entrance slit 46 is located in the focal plane 20 of the concave mirror 12. The axis line 19 bisects the angle between incident ray 26 and diffracted ray 28. As both the entrance and exit slits are located in the focal plane of the mirror 12, the length of the optical system may be predetermined by selection of a suitable radius of curvature for the mirror 12. For example, in one application the focal length of the mirror was thirty inches and its polished concave surface was seven and one-half inches in diameter. The grating used in the system with this mirror had three inches of ruling (30,480 lines/inch) with lines two and one-half inches long. The linear spectral dispersion in the focal plane was 5 A. U. per mm. in the second order.

Figure 4:
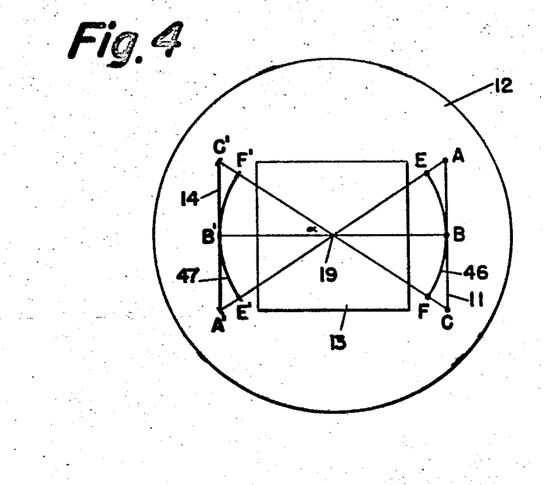
Fig. 4 is a diagrammatic end view of the improved optical system embodying the additional features of the curved entrance and exit slit structure of the present invention as shown in Figs. 1 and 2.

The curved slit structure of the present invention will now be described in detail. Referring to Fig. 4 there is diagrammatically shown an end view of the improved optical system of the present invention, both curved slits and straight slits being illustrated for comparison purposes. The mirror 12 is behind the plane of the paper, the grating 13 is facing the mirror 12 and is nearer the plane of the paper, the straight slits 11 and 14 and the curved slits 46 and 47 are in the plane of the paper, and the axis of the system is indicated at point 19. By reason of the symmetry of the optical system, as hereinbefore described in connection with Fig. 3, and because of the astigmatism of the system, a short line image of the point B on the straight entrance slit 11 is formed at B' on the straight exit slit 14. The line B' is perpendicular to the line B', 19, B. A line image of the point A at one end of straight entrance slit 11 is formed at A' perpendicular to the line A', 19, A, but not parallel to the straight exit slit 14. Similarly, a line image of point C at the opposite end of the straight entrance slit 11 is formed at C' perpendicular to line C', 19, C but not parallel to the straight exit slit 14. Thus, it will be seen that with increasing length of the straight entrance slit 11, the image formed at the straight exit slit 14 will become less well defined. However, this deficiency of the system is overcome in accordance with this invention by the provision of curved entrance and exit slits such as slits 46 and 47. If the slits 46 and 47 are circular arcs with their center of curvature at 19, then every point on the entrance slit is formed into a line image which is tangent to the exit slit at the focus. Thus, the image of the point E at entrance slit 46 is a line at E' which is tangent to the arc E'F' at exit slit 47, and point F at entrance slit 46 is a line at F' which likewise is tangent to the arc E'F' at exit slit 47, so that a sharp, well-defined image of entrance slit 46 will be formed at exit slit 47 regardless of the length of the slits. As may be seen in Fig. 4, the curved or arcuate slits 46 and 47 do not require any increase in diameter of the mirror 12.

For a given resolution the allowable width of the curved slits decreases with increasing length of slit according to the law:

$$(1) \qquad \frac{W'}{W} = \cos \alpha$$

where:

W' is the allowed slit width at F' and F,
W is the slit width at B and B', and
α is the angle between B', 19 and F', 19.

From the foregoing it will be seen that the slit opening should be crescent shaped because spectral dispersion is, at every point on the slit, parallel to the center line of the slits, and a crescent shaped opening will have constant spectral width. Accordingly, the inner and outer jaws of the curved slit can be provided with the same radius of curvature and then be moved along their center line in order to change the slit width, thereby forming a crescent shaped opening. As shown by applicant in a paper entitled "Image forming properties of the Ebert monochromator," 42 JOSA, pages 647–651, correction for astigmatism error in the manner above explained also corrects for wavelength error when curved slits dimensioned as above outlined are used in systems like those shown in Figs. 1–3. Wavelength errors which arise from if circular slits, in accordance with this invention, are used with the center of curvature at the point 19 as illustrated in Fig. 4.

A plane grating when used with straight slits, such as slits 11 and 14, Fig. 4, produces curved spectral lines. This results because the angle that an incident ray 26, Fig. 3, makes with the bisector line, such as line 19, between the incident ray and the diffracted ray, such as ray 28, for a given position of the grating will vary for different points along straight entrance slits. Because of this, the wavelength emergent from the monochromator varies along the exit slit. However, in accordance with the present invention when the circular slits, such as slits 46 and 47, are used with their center of curvature at 19, Figs. 3 and 4, the angle between the incident ray 26 and the bisector line 19 is the same for all points on the curved entrance slit and the angle between the bisector line 19 and the diffracted ray 28 is of equal magnitude and the same for all points on the curved exit slit. Thus, there is no wavelength error along the exit slit. As already pointed out, the described construction not only corrects for astigmatism error but also for wavelength error arising in the foregoing manner.

Figure 5:
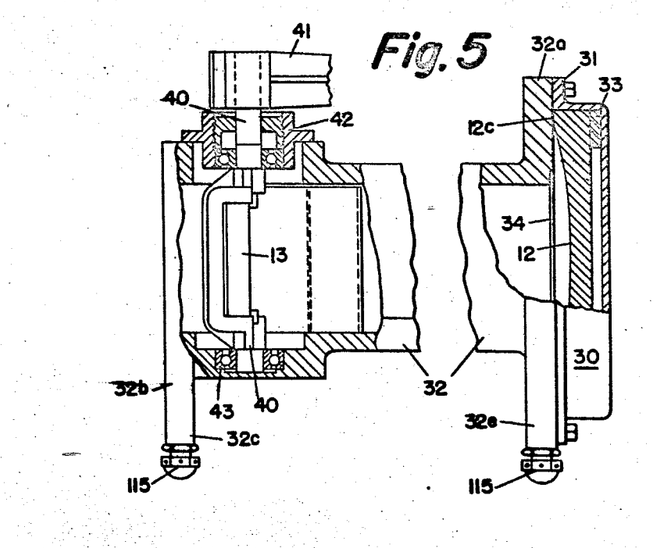
Fig. 5 is a fractional elevation view partly in section of a monochromator assembly of the type shown in Figs. 1 and 2.

The minimum radius of curvature of the circular slits 46 and 47 is dependent upon the size of the grating and the maximum radius of curvature of slits 46 and 47 is limited only by the size of the mirror. The internal dimensions of the monochromator housing 32, Fig. 5, are made to accommodate a mirror of selected size. Thus, it is seen that the radius of curvature of the entrance and exit slits may be varied within relatively wide limits. One suitable construction has been illustrated in Figs. 6–8.

Figure 6:
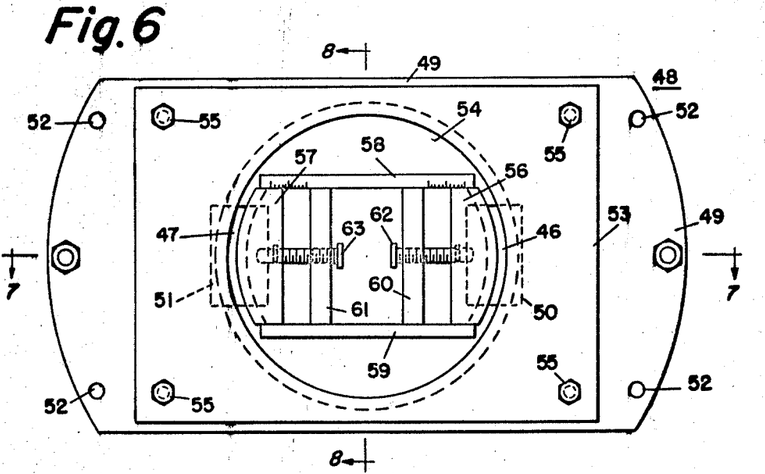
Fig. 6 is an elevation view of an end plate assembly for the monochromator assembly of Fig. 5 including curved entrance and exit slit structure.
Figure 7:
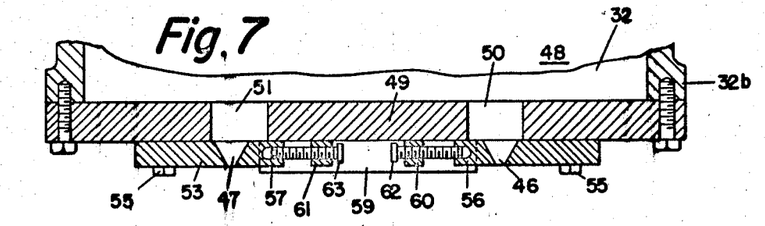
Fig. 7 is a view in cross section taken along the lines 7—7 in Fig. 6.
Figures 8, 9:
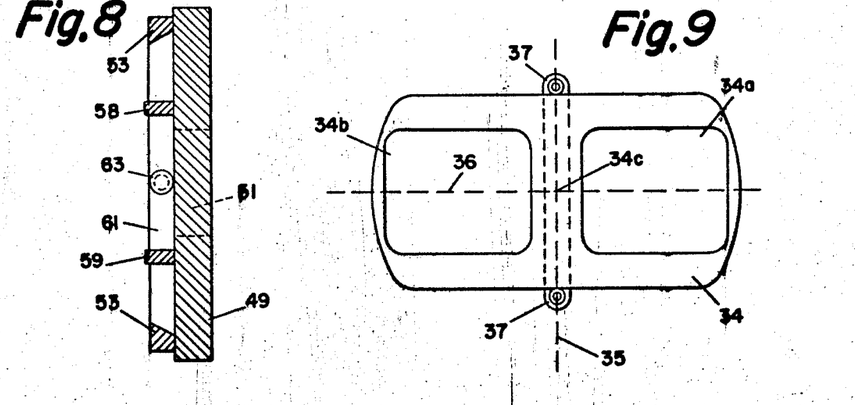
Fig. 8 is a view in cross-section taken along the lines 8—8 in Fig. 6.
Fig. 9 is a view of the mirror mask for the monochromator illustrated in Figs. 1, 2 and 5.

In Figs. 6–8 there is shown an end plate assembly 48 provided with curved slit structure and which is adapted to be secured to the end flange 32b of tube 32 shown in Fig. 5. The end plate assembly 48 comprises an end plate 49 provided with a pair of openings 50 and 51. End plate 49 may be secured to flange 32b of tube 32 by any suitable means, for example, screws adapted to be inserted through openings 52 in end plate 49. To form the outer jaws of the entrance and exit slits 46 and 47 there is provided a plate 53 which has a beveled circular opening 54 extending therethrough. The plate 53 may be secured to end plate 49, for example, as by a plurality of screws 55. The inner jaws of the curved entrance and exit slits 46 and 47 are formed by means of members 56 and 57, each of which is provided with a curved beveled end, the radius of curvature of which is the same as the radius of curvature of the beveled circular opening 54 in plate 53. If entrance and exit slits of fixed width are to be used, the inner jaw members 56 and 57 may be positioned in the circular opening 54 and held against the end plate 49 adjacent the corresponding rectangular openings 50 and 51 in any suitable manner, for example, as by screws. The maximum length of each slit which can be used will be half the circumference of the circle along which the slit openings lie. As shown in Fig. 6, the length of slits 46 and 47 is established by the length of the openings 50 and 51 along the circumference of the circle which includes the slits. Other factors such as detectors or source dimensions will have a bearing on the useful or particular length to be employed.

It is also possible to provide for adjustment of the slit width. For this purpose there is provided a pair of ways 58 and 59 separated by cross members 60 and 61. The ways 58 and 59 are secured, as by welding, to the outer surface of end plate 49 in spaced parallel relation to each other and are adapted to receive slideably therebetween the inner jaw members 56 and 57 of the corresponding slits 46 and 47. The cross members 61 and 60 each are provided with a threaded opening for receiving threaded members 62 and 63, the corresponding responding jaws 56 and 57 for movement of the latter between the ways 58 and 59. The foregoing arrangement provides for unilateral adjustment of the width of curved slites 46 and 47. As shown in Fig. 6, way 58 has been provided with a pair of scales which may be used in conjunction with the micrometer means shown in the form of screws 62 and 63 for accurately positioning the inner jaws 56 and 57, though in general the threaded members 62 and 63 may themselves be micrometers with associated micrometer scales which may be read to determine the positioning of jaws 56 and 57 in terms of width of the slits 46 and 47. While separate adjusting means have been shown for each of jaws 56 and 57, it is to be understood that simultaneous adjustment of inner jaws 56 and 57 may be had by the provision of a suitable arrangement, for example, of the turnbuckle type, as shown at 211, Fig. 10. It is also to be understood that bilateral adjustment of the width of slits 46 and 47 may be provided. Instead of securing plate 53 to end plate 49 by means of screws 55, the end plate 53 may be cut in two and moved in ways in the end plate 49 in a manner similar to that described for the inner jaws 56 and 57 of the slits 46 and 47. Thus, the width of the curved slit openings 46 and 47 may be adjusted either unilaterally or bilaterally.

Figure 10:
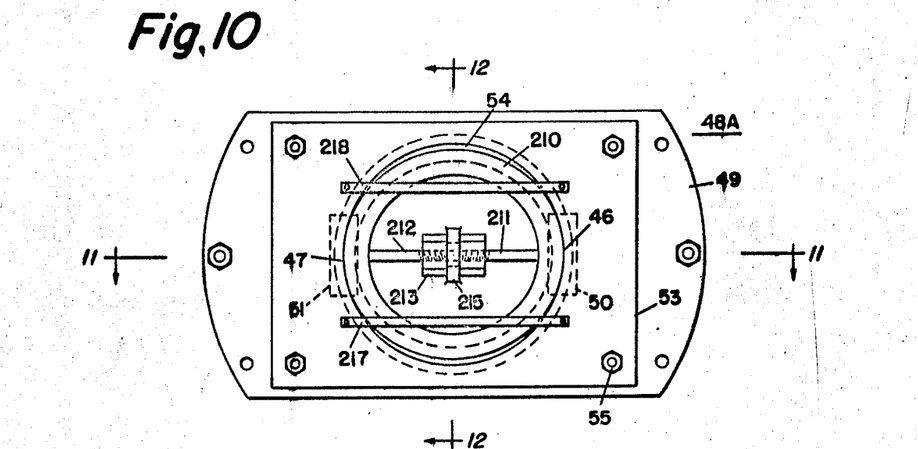
Fig. 10 is an elevation view of a modification of an end plate assembly for the monochromator of Fig. 5 including an elastic ring member.
Figure 11:
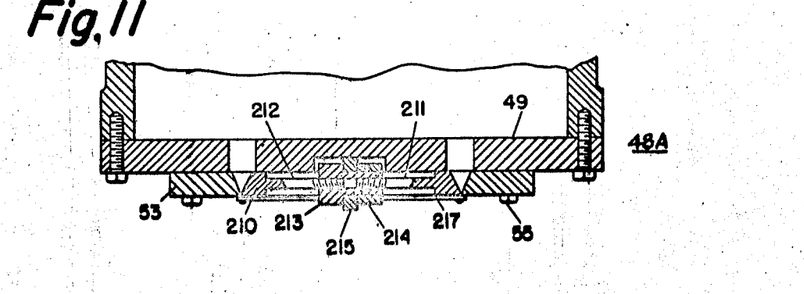
Fig. 11 is a view in horizontal cross-section taken along the line 11—11 of Fig. 10.
Figure 12:
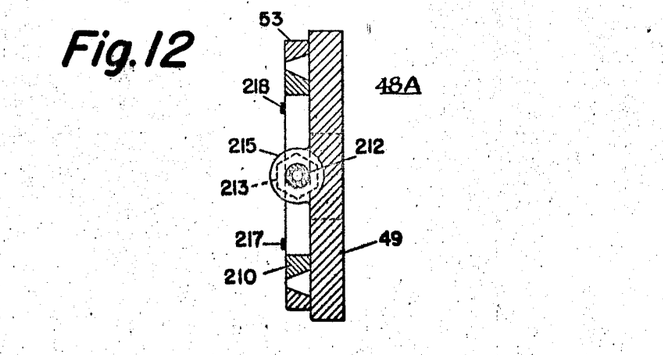
Fig. 12 is a view in vertical cross-section taken along the line 12—12 in Fig. 10.

In Figs. 10–12 there is shown a modification of the end plate assembly previously described in connection with Figs. 6–8. The end plate assembly 48A shown in Figs. 10–12 is provided with curved slit structure and is adapted to be secured to the end flange 32b of tube 32 shown in Fig. 5. The parts of assembly 48A that are similar to the parts in assembly 48 have been identified with corresponding reference characters.

In Figs. 10–12, it will be seen that end plate 49 has secured thereto, as by screws 55, a plate member 53 identical to plate 53 shown in Figs. 6–8. Within the circular opening 54 of plate 53 is disposed a deformable elastic ring 210. To opposite diametral portions thereof are secured threaded elements 211 and 212 which together with a rotatable threaded member 213 form a turnbuckle-adjusting means. The element 213 may be cylindrical, but is preferably hexagonal, in form, with a central guideway 214 supported by a stationary member 215 secured to the frame 49 as indicated by the symbol for a stationary support. Thus, the supporting member 215 acts as a guide for the rotatable element 213 and also as a support of the ring 210. Further to support the ring 210 in coplanar relationship with the plate 53 are two supporting members 217 and 218 which extend across and are secured to the plate 53, as by cap screws, in regions outside the curved slits formed by the ring 210 in conjunction with the opening in plate 53.

The ring 210 may be initially of oval shape with the major axis to the outside edges of the ring equal to the diameter of the opening in plate 53. That major axis lies along the axis of elements 211 and 212, the slit width in the initial assembly being a minimum, approaching zero as a limit. Upon rotation of turnbuckle element 213 the length of the major axis of the ring 210 is shortened, simultaneously increasing the width of the slits 46 and 47. These slits 46 and 47 are approximately circular and are approximately crescent-shaped in close conformity with the requirements of Equation 1 previously referred to.

The range of adjustment of slit width will be fixed by the difference between the diameter of the opening 54 in plate 53 and the length of the minor axis of the ring 210 before deformation by the turnbuckle assembly. More particularly, element 213 may be rotated, gradually to shorten the major axis of ring 210 until it becomes equal to the minor axis and slightly beyond or until the ring 210 engages the walls forming the opening in plate 53 along portions thereof normal to the diameter of the ring taken along the axis of the elements 211 and 212. The elements 211 and 212 are of such length that their ends engage as the maximum slit width is attained to prevent turning of element 213 at a limit of adjustment of slit width.

It is to be understood the turnbuckle arrangement shown is illustrative of a micrometer means applied to engage the ring at diametrically opposite portions bodily to move the portions thereof forming the inner jaws of the slits 46 and 47.

When curved slits of fixed width are desired, the ring 210 may be fixed in position by the supporting members 217 and 218, relative to an outer ring or with respect to the circular opening of plate 53, the width of the slits in such case being determined by the undeformed diameter of the inner ring 210 and/or the degree of permanent deformation imparted thereto.

Figures 13, 14, 15, 16:
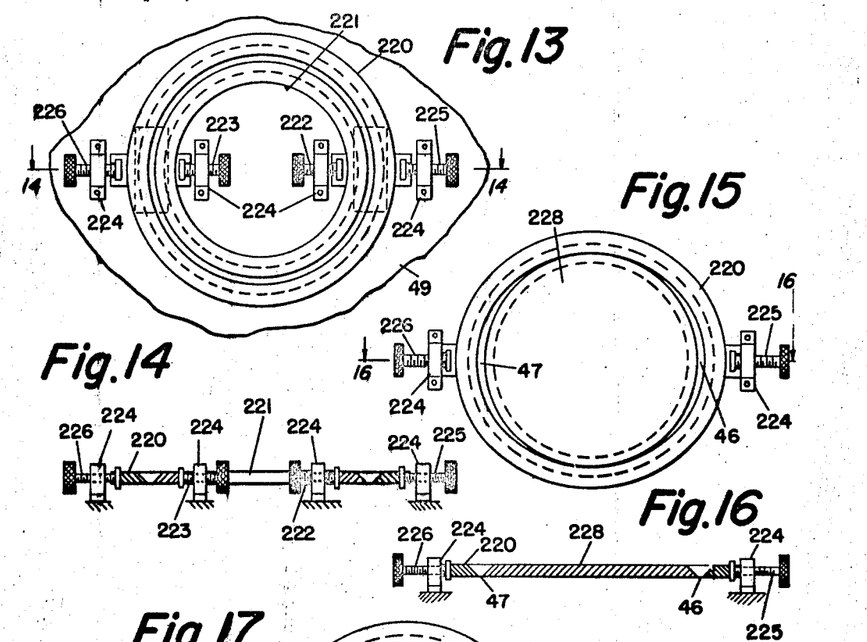
Fig. 13 is a fragmentary elevation of another modification of an elastic ring assembly including two rings.
Fig. 14 is a sectional view taken on the line 14—14 of Fig. 13.
Fig. 15 is an elevation showing a further modification of an elastic ring assembly.
Fig. 16 is a view in cross-section taken along the line 16—16 of Fig. 15.

Referring to the modification of Fig. 13, there is disclosed an outer ring 220 and an inner coplanar concentric ring 221. The inner ring 221 will preferably have the same initial oval shape as described for the ring 210 of Fig. 10. The outer ring 220 will preferably have an initial oval shape with its major axis at right angles or normal to the major axis of ring 221. Thus, in initial assembly the curved slits 46 and 47 are initially of a minimum width or approximately closed. As shown in Figs. 13 and 14 adjusting screws 222, 223, 225 and 226 have been actuated to deform the rings 220 and 221 into perfect circles.

In Fig. 13 the adjusting screws 222 and 223 for the inner ring 221 threadedly extend through stationary supports 224 which are secured to the stationary frame 49, as by screws. The ends of the adjusting screws 222 and 223 have enlarged heads nesting within pockets secured to or formed in ring 221, the enlarged heads preferably being pivotally secured to the adjusting screws in the manner well known to those skilled in the art and such as are used on C-clamps. The pockets themselves may be brazed or otherwise secured to the rings.

The outer ring 220 has associated with it the adjusting screws 225 and 226 which threadedly extend through stationary supports 224 identical with those previously described. The length of the major axis of inner ring 221, coaxial with the adjusting screws, may be shortened by rotating them in the correct directions while the minor axis of the outer ring 220 also coincident with the axis of the adjusting screws, may be lengthened by appropriate adjustment of screws 225 and 226. Only limited adjustment is permitted of each screw, the walls forming each pocket for a screw head engaging its associated support at a limit of adjustmnet.

For independent bilateral adjustment of each slit the screws 222 and 225 are preferably adjusted by equal amounts and in the same direction as regards change in slit width; that is, if one is adjusted to increase the slit width, the other is adjusted by a like amount to increase slit width, and vice versa. Thus, screws 222 and 225 may be mechanically connected together for simultaneous adjustment thereof. Similarly, adjusting screws 223 and 226 may be mechanically connected together with simultaneous adjustment thereof.

In the modification of Fig. 15, only an outer ring 220 has been illustrated to form in conjunction with a disc 228 the circularly curved slits 46 and 47. The adjusting screws 225 and 226 serve the same functions as described in connection with Fig. 10. In Figs. 15 and 16 the ring 220 is shown in position for a maximum slit width. It is to be noted the screws 225 and 226 have reached a limit of movement in the slit-opening direction.

Figure 17:
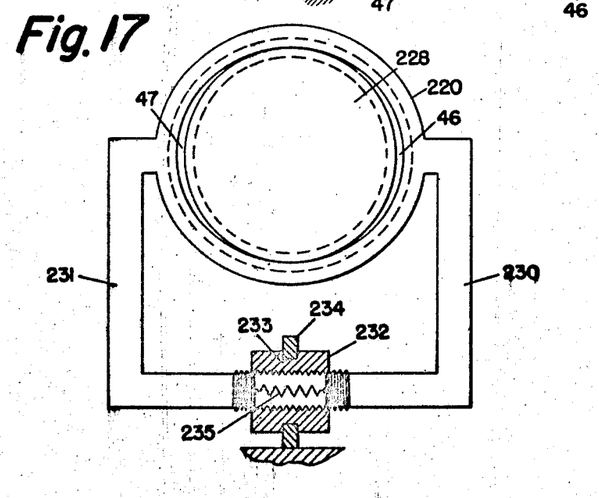
Fig. 17 is an elevation, partly schematic, illustrating a further modification of the invention.

In the modification of Fig. 17 there has been illustrated in conjunction with the outer ring 220 and the disc 228 of Fig. 15 a means for simultaneous movement of diametrically opposed portions of ring 220 for adjustment of the width of slits 46 and 47. This adjusting means is shown as comprising two arms 230 and 231 which engage or are secured to ring 220 and which are moved diametrically of ring 220 by means of a threaded element 232 having a guideway 233 into which extends a stationary guiding and supporting ring 234 carried by the frame 49 as indicated by the symbol for a stationary support.

In Fig. 17 a tension spring 235 spring-biases the elements 230 and 231 toward each other. The arms 230 and 231 are shown in positions of maximum separation. Their threaded ends are out of engagement with threaded element 232. When it is rotated in direction to decrease the width of slits 46 and 47 the threaded ends enter element 232 under the influence of spring 235.

The several adjusting arrangements have varying slit widths comprising micrometer means for moving and deforming one ring structure relative to an associated member forming the jaws of the respective slit structures or relative to a second ring structure forming the associated jaws of the slit structure. Where two rings are utilized, one ring is elongated about an axis angularly disposed 90° from a like axis of the other ring. In all cases the curved slit openings have a radius of curvature closely approximating that of the circle along which each slit is located, each slit being at the ends of the same diameter of that circle. Each of the curved slits 46 and 47 have coplanar opposed boundary lines in the plane of the circle with respect to which they are located and coincident with the focal plane of an element of the optical system. The element of the optical system referred to is of course, the concave spherical mirror 12 of Figs. 1 and 2, this element being a radiation focusing means having its focal plane extending along the plane of the circle in which the entrance and exit slits 46 and 47 are disposed. The opposed boundary lines in the several modifications are the opposed knife-edges of the U-shape slits formed by the beveled slit jaws.

Referring now to Fig. 5, the housing for the foregoing optical system may comprise the optical tube 32 of rugged construction, for example, a relatively thick wall casting having end flanges 32a and 32b of substantial thickness integral therewith. The outer faces of flanges 32a and 32b are finished in a manner such that the plane of each outer surface will be parallel to the other and both will be perpendicular to the longitudinal central axis of the tube or housing 32, which axis is to be coincident with the central axis of mirror 12. The mirror 12 is provided with a flat annular area 12c of uniform width surrounding the concave reflecting surface for abutting engagement with the finished outer surface of flange 32a of tube 32. The mirror 12 is adapted to be supported in position by a cup-shape casting 30 which has an inner diameter slightly greater than the diameter of mirror 12. The casting 30 may be secured to flange 32a of tube 32 by a series of circumferentially disposed cap screws 31 with the central axis of the cup-shaped portion of casting 30 being coincident with the central axis of the tube 32. A rubber backing member 33 may be provided between the back of mirror 12 and the inner back wall of casting 30 to assure that the flat annular face 12c of the mirror will be firmly pressed against the finished end surface of flange 32a. Since the mirror 12 circumferentially closely fits the inner side wall of casting 30, and since the flat annular area 12c is of uniform width, the central axis of the cup-shaped portion of casting 30 and of mirror 12 supported therein will be coincident. Accordingly, when casting 30 is secured to flange 32a, in a manner as described above, the central axes of tube 32 and mirror 12 will be coincident. Thus, there is not only provided for mirror 12 a rugged solid mounting, but one which does not require adjustment. It is in adjustment upon assembly.

The opposite end of tube 32 is provided with the closure member 49 (Figs. 6, 7, 8, 10, 11, 12 and 13) having corresponding apertures for the entrance and exit slits hereinbefore described in detail. Closure member 49 is secured to the finished surface of end flange 32b of tube 32 as by cap screws and slit structures will be accurately aligned on the opposite sides of the axis of the optical system when closure member 49 is secured in place. Accordingly, there is provided a simple rugged monochromator construction wherein the optical elements of the system will be properly positioned with respect to the optical axis of the system upon securing the closure members 30 and 49 to the corresponding end flanges of the optical tube 32.

In order to reduce scattering of radiant energy within the tube 32 a mirror mask 34 may be provided so as to limit reflections from the mirror to areas 12a and 12b. The mask 34 is positioned in a counterbore in the finished surface of flange 32a, directly in front of mirror 12, Fig. 5. As shown in Fig. 9 the mirror mask 34 is provided with two identical openings 34a and 34b. The opening 34a serves to mark out the boundary of reflecting surface 12a and in like manner opening 34b marks out the boundary for reflecting surface 12b of mirror 12. The mask 34 is positioned with respect to tube 32 so that the central axis of tube 32 and the coincident axis of mirror 12 will intersect the central point 34c of mask 34, the central point 34c being defined by the intersection of the center lines 35 and 36 in Fig. 9. As may be seen the openings 34a and 34b are positioned equidistant from and on opposite sides of the vertical center line 35, and they are positioned centrally with respect to the horizontal center line 36 such that the corresponding halves of openings 34a and 34b extend above and below the line 36. The mask 34 may be secured against rotation in the counterbore by means of screws adapted to be inserted through openings 37 of mask 34.

Referring to Fig. 5, the tube 32 is provided with a plurality of supporting legs. End flange 32b is provided with a pair of extensions 32c to form two supporting legs and a third supporting leg of the tube is formed by the extension 32e of the other end flange 32a. The extension 32c of end flange 32b are spaced apart one from the other and are in the same plane. Accordingly, only one extension 32c is visible in Fig. 5. The third support leg formed by extension 32e is disposed centrally of the bottom edge of flange 32a. Adjustable leveling posts 115 may be provided for each of the three extensions as shown in Fig. 5.

The dispersing means or grating 13 of Figs. 1, 2 and 5 is carried by a cross shaft 40 to which is secured the arm 41. The cross shaft 40 is journaled in bearing assemblies 42 and 43, the construction of which may clearly be seen in Fig. 5. The grating 13 may be rotated about the axis of cross shaft 40 by moving arm 41. There may be provided mechanism for continuous rotation of grating 13 throughout a predetermined angle to provide for scanning of various portions of the spectrum as shown in the system illustrated in Fig. 2, or there may be provided mechanism for step-by-step positioning of the grating 13 for selection of a desired spectral line or band as illustrated by the system shown in Fig. 1. Also, the continuous drive mechanism, as well as the step-by-step mechanism for rotating the grating 13, may be combined in a single instrument, thereby permitting alternative use. The foregoing drive mechanisms for the grating 13 will hereinafter be described more in detail and are also described in my parent application Serial No. 241,194.

Referring now to Figs. 1, 2, and 5, the position of the grating 13 for selection of the desired spectral band is determined by angular rotation of the grating arm 41 about the axis 40. The arm is biased to turn clockwise by a spring 74 and is accurately positioned by engagement of the spherical surface of ball 41a held by arm 41 with the plane end-surface of a stop member 67 of a position-determining assembly or turret 68. The ball 41a in arm 41 is illustrated in Fig. 1 in spaced relation with stop 67. This may be accomplished by a rotatable cam 69 engaging a cam follower 70 carried by arm 41, the cam 69 moving arm 41 to the extended position illustrated.

As shown in Fig. 1 the cam 69 is secured to the shaft 71 driven by a motor 72. The motor 72 preferably is designed for constant speed rotation and drives cam 69 through a suitable reduction gearing (not shown) in a clockwise direction as viewed in Fig. 1, cyclically to move arm 41 to the extended position illustrated in Fig. 1 and to permit its return as by a spring 74 until arrested by engagement of spherical surface 41a with the end of a stop, for example, stop member 67, positioned and locked into place with reference to a rotatable support 75. Thus, as the surface of ball 41a engages stop 67, Fig. 1, the grating 13 predetermines the narrow region of the dispersed spectral energy which will pass through the exit slit 47 to the photomultiplier tube 15. The measurement of the intensity thereof in a manner well understood by those skilled in the art will be initiated, as by the actuation of a switch under the control of a cam also secured to shaft 71.

To initiate the measurement of another spectral line another cam 79 also carried by shaft 71, Fig. 1, moves the contacts of switch 78 from an open position to a circuit-closing position Fig. 1, since cam follower of switch 78 will engage the crest 79a of the cam 79. This switching operation, which may involve a plurality of circuit-controlling contacts, is utilized to establish an energizing circuit for the actuator 80 of the line-selecting mechanism. The actuator 80 may be of any suitable type, for example, a stepping relay or a motor having control circuits as described and claimed in U. S. Letters Patent No. 2,735,330, granted upon copending application Serial No. 241,172, filed August 10, 1951, by Norman E. Polster.

While the foregoing discussion has dealt with the mechanism for step-by-step positioning of the grating 13, the continuous drive mechanism for grating 13 illustrated in Fig. 2, will now be described. For some applications it is desirable to scan a wide spectral region rather than to select specific lines or narrow bands therefrom for which the step-by-step mechanism is designed and it is for these applications that the continuous drive mechanism is applicable. As shown in Fig. 2, provision has been made for continuous scanning of the spectrum and for scanning the spectrum at multiple speeds. For example, in some applications it may be necessary to scan the spectrum at relatively low speeds, for example, in the order of one or less Angstrom per minute. For other applications it may be necessary to scan at a slightly higher speed, for example, in the order of 30 Angstroms per minute and in other applications, it may be necessary to scan at a relatively high rate of speed, for example, in the order of 1780 Angstroms per minute.

Accordingly, there is schematically shown in Fig. 2 mechanism for continuously scanning the entire spectrum and for scanning the spectrum at multiple speeds. As in the case of Fig. 1, the grating 13 is rotated about the axis of its supporting cross shaft 40 by moving the lever arm 41 secured at one end of cross shaft 40. The means for moving lever arm 41 is as follows: There is provided a reversible motor 81 which is energized from lines L1, L2, the motor preferably being designed for constant speed rotation for driving a connecting shaft 82 and a plurality of gears 83—85 secured thereto at a uniform speed. A second shaft 86 is disposed parallel to shaft 82 and is provided with a plurality of gears 87—89 which normally are freely rotatable on shaft 86 and which are disposed for engagement with corresponding gears 83—85. Thus, when motor 81 is energized, shaft 82 will be rotated as will gears 83—85 carried thereby and gears 87—89, the latter gears being driven by gears 83—85. Since gears 87—89 are freely rotatable on shaft 86 there will be no rotation of shaft 86 at this time.

Secured to shaft 86 are a plurality of clutch plates or discs 90—92 which are adapted to be moved into frictional engagement with the corresponding gears 87—89 by means of suitable levers 93—95. Upon actuation of one of the levers 93—95, the corresponding clutch plate 90—92 will be moved into frictional engagement with the corresponding gears 87—89, thereby locking the gears 87—89 to the shaft 86 for rotation of the latter. As may be seen in Fig. 2, each of gears 83—85 is progressively larger in diameter, whereas each of gears 87—89 is progressively smaller in diameter. Accordingly, when lever 93 is actuated to secure gear 87 to shaft 86, the shaft 86 will rotate at a relatively slow speed. When lever 95 is actuated to secure gear 89 to shaft 86, the shaft 86 will be rotated at a relatively high speed. Similarly, when lever 94 is actuated to secure gear 88 to shaft 86, shaft 86 will be driven at an intermediate speed.

For rotating the grating 13 in reverse directions about its supporting cross shaft 40, there is provided a drive screw mechanism 100 which is connected to shaft 86 by a suitable gear train which has been illustrated as a plurality of beveled gears 97a—97d. The drive screw mechanism 100 comprises a housing 120 which is provided with ball races 121, 122 for rotatably carrying drive member 123, the latter being provided with a shaft which is connected directly to beveled gear 97d. The drive member 123 is provided with an internally threaded portion 123a for receiving the threaded end 125a of driven member 125. As shown in Fig. 2, the opposite end 125b of driven member 125 is adapted to bear against a second ball surface similar to 41a in arm 41, the arm 41 being biased in position by means of spring 74. The driven member 125 is provided with a keyway 126 and is keyed to the housing 120 as by key 127 to prevent rotation of driven member 125. Upon rotation of drive member 123 through gear train 97a—97d and shaft 86, the threaded end 125a of driven member 125 will be caused to advance longitudinally with respect to the housing 120; however, the driven member 125 will not be rotated since it is keyed to the housing 120 by means of key 127. Upon movement of driven member 125, the slot 126 will move longitudinally with respect to the key 127.

Provision also is made for reversing the direction of movement of driven member 125. Reversing switch 118 having contacts 118a and 118b is provided in the control circuit of motor 81. With the reversing switch 118 in a position for completing a circuit through contact 118a, the driven member 125 will advance in a forward direction until pin 128 carried thereby engages the actuating lever 129a of a limit switch 129 which breaks the circuit of motor 81 and prevents further movement of driven member 125 in a forward direction. To reverse the direction of movement of driven member 125, reversing switch 118 is moved to close the circuit of motor 81 through contact 118b thus causing driven member 125 to reverse its direction of movement and travel toward the limit switch 130. Upon engagement of pin 128 with the actuating member 130a of limit switch 130, the circuit of motor 81 again will be broken thereby preventing further advancement of driven member 125 in a direction toward limit switch 130. This reciprocable movement of driven member 125 will cause arm 41 to be rotated first in a counterclockwise direction and then in a clockwise direction, which in turn rotates grating 13 about the axis of its cross shaft 40 in corresponding directions. Accordingly, the rotation of grating 13 first in one direction and then in the other direction will cause an image of the spectrum to be moved across the exit slit 47 of the monochromator system, thereby permitting the spectrum to be scanned first in one direction and then in a reverse direction during which time measurements of the peak intensities of the various lines of the spectrum may be measured and recorded, or selected spectral lines or the substantially monochromatic radiant energy of a narrow band of wavelengths may be isolated for other applications wherein such procedure is desirable. The length of time for scanning the spectrum will be determined by selection of the gear ratios as previously described. It is also to be noted that with the motor 81 deenergized and the clutches released, the screw 125 may be positioned manually by rotating drive member 123.

Both the mechanism for step-by-step positioning of the grating and for continuous scanning of the spectrum may be combined in a single instrument. In connection with the continuous scanning operation, the drive screw mechanism 100 may be provided with a suitable counter driven from a shaft directly connected to the drive member 123. The counter may be calibrated in terms of wavelength so as to indicate the corresponding spectral lines as they pass over the exit slit of the monochromator. The drive screw mechanism 100 has been mounted in a position such that the angle between the grating arm 41 and the axis of drive screw mechanism 100 will produce a linear relation between the counter reading and wavelength.

The gear mechanism schematically illustrated in Fig. 2 may be placed within a housing and levers 93—95 may be provided with push buttons as fully described in parent application Serial No. 241,194. Since both motor 72, Fig. 1, and motor 81, Fig. 2, are constant speed motors and are utilized for moving arm 41, a single motor may be substituted therefor for driving shaft 71 and drive screw mechanism 100 when both step-by-step and continuous scanning of the spectrum are combined in a single instrument. The control system for the complete spectrometer system may be of the type more fully disclosed in the aforesaid Patent 2,735,330.

The optical system of the present invention is also suitable for forming a precise optical image comprising undispersed radiation. For example, in Figs. 1 and 2 the grating 13 may be replaced by a plane mirror with the reflecting surface thereof perpendicular to the central axis of mirror 12 and parallel to curved slits 46 and 47. With the optical elements in this relation there will be formed at exit slit 47 a precise sharply defined image of entrance slit 46 comprising total radiation rather than a selected spectral line as in the case of the aforementioned systems.

While preferred embodiments of this invention have been illustrated, it is to be understood that the invention is not limited to the specific arrangements shown and that further modifications may be made without departing from the spirit and scope of the invention as set forth in the appended claims.

What is claimed is:

1. In an astigmatic optical system including reflecting means and dispersing means disposed for directing dispersed radiant energy to said reflecting means, said dispersing means being disposed on the central axis of said system, means for improving the spectral resolution of the system when using slits of substantial length comprising a circular slit for passage therethrough of radiant energy from a source to said dispersing means, a like circular slit for receiving thereat an image of said first-named slit formed by reflected substantially monochromatic dispersed radiant energy from said source, each point of said first-named circular slit being imaged as a short straight line at said last-named circular slit, said circular slits being disposed opposite each other on the circumference of a common circle having its center on said axis of said optical system and in the focal plane of said reflecting means.

2. An arrangement according to claim 1 wherein each of said circular slits comprises a pair of jaws, one jaw of each of said pairs being movable relative to the other jaw of the pair for adjustment of the width of each of said slits.

3. An arrangement according to claim 1 wherein each of said circular slits comprises a pair of jaws, both of said jaws of each pair being adjustable relative to each other for bilateral adjustment of the width of said slits.

4. An arrangement according to claim 2 wherein one jaw of each of said pairs forms portions of a common ring structure.

5. An arrangement according to claim 2 wherein said movable jaws of each of said pairs form portions of elastic ring structure.

6. An arrangement according to claim 3 wherein one jaw of each of said pairs forms a portion of an elastic ring structure and the other jaw of each of said pairs forms a portion of another elastic ring structure.

7. A spherical optical system for a spectrometer which is free from the image errors usually resulting from the use of off-axis spherical reflectors and free from variation in spectral wavelength along the exit slit thus having a high degree of spectral resolution comprising a pair of spherical concave reflecting surfaces disposed symmetrically on opposite sides of a central axis of the optical system, a dispersing device of the reflecting type disposed along said axis in face-to-face relation with said surfaces, a circular entrance slit disposed to one side of the axis for admitting a beam of light to one of said reflecting surfaces for reflection therefrom to said dispersing device, said dispersing devices being disposed to re-direct dispersed radiant energy to said second concave reflecting surface, and a circular exit slit positioned at the opposite side of the axis of said system in the same plane as said entrance slit for receiving radiant energy reflected from said other concave reflecting surface, each point of said entrance slit being imaged as a line tangent to the arc of said exit slit and both said entrance slit and said exit slit being diametrically opposite each other and extending along the circumference of a circle having its center at the central axis of said optical system.

8. An optical system comprising structure including concave spherical reflecting means having reflecting portions, structure including a plane reflector facing said surface, a circularly curved entrance slit through which radiant energy passes to a first of said reflecting portions, said first portion redirecting said received energy to said reflector, said reflector redirecting radiant energy received from said first portion to a second of said reflecting portions, said first and second portions being located on the trace of a common sphere and on opposite sides of a central axis midway between them for producing a circularly curved image of said entrance slit in a plane substantially normal to said axis and at a distance from said reflecting means substantially equal to one-half the radius thereof, said entrance slit and said image being equidistant from said axis on opposite sides thereof and each having a radius of curvature corresponding to its distance from said axis, and an exit slit circularly curved in correspondence with the curvature of said image.

9. An improved optical system for a monochromator for providing an image of an object having high energy intensity without loss of spectral resolution comprising structure including a concave spherical mirror, structure including a plane reflection grating facing said mirror, a circularly curved entrance slit through which radiant energy is received by a first portion of said mirror, said first portion redirecting said received energy to said grating, said grating redirecting radiant energy received from said first portion to a second portion of said mirror, said portions of said mirror being located on the opposite sides of a central axis for production of a circular curved image of said object in a plane substantially normal to said axis and at a distance from said mirror substantially equal to one-half the radius of said mirror, said entrance slit and said image being substantially equidistant from said axis on opposite sides thereof and lying on the circumference of a common circle, an exit slit circularly curved in correspondence with the curvature of said image, and means for rotating said grating to vary the spectral character of the energy forming said image.

10. Curved slit structure of adjustable-slit width for passage of radiant energy therethrough to an optical system comprising means including ring structure forming one jaw of said slit structure, a second jaw of said slit structure cooperating with said first jaw, and micrometer means for moving and deforming said ring structure to move said first jaw relative to said second jaw for adjustment of the slit width.

11. Curved slit structure according to claim 10 wherein said second jaw is movable relative to said first jaw for bilateral adjustment of the slit width.

12. An arrangement according to claim 11 wherein said second jaw forms a portion of a second ring structure, and micrometer means for moving and deforming said second ring structure to elongate it about an axis angularly disposed 90° from a like axis of said first-named ring structure for adjustment of slit width.

13. In an optical system for a spectrometer, a pair of deformable rings the outer diameter of one ring being substantially the same as the inner diameter of the other ring, said rings being disposed to form crescent-shaped slits between them and circumferentially thereof, said slits being located diametrically opposite each other and the nearest to each other of the opposed boundary lines of each slit being coplanar.

14. In an optical system for a spectrometer, a pair of deformable rings the outer diameter of one ring being substantially the same as the inner diameter of the other ring, said rings being disposed to form crescent-shaped slits between them and circumferentially thereof, said slits being located diametrically opposite each other, a pair of adjacent opposed boundary lines of each slit being coplanar, and reflecting means for redirecting radiant energy from one to the other of said slits, said opposed slits being located in substantially the focal plane of said reflecting means.

15. Curved slit structure for a monochromator or the like comprising a pair of elastic deformable ring members arranged concentrically, micrometer means for deforming each of said ring members to deform one of them into an ellipse the major axis of which is displaced 90° from the major axis of the ellipse into which the other of said ring members is deformed, the outside diameter of one of said ring members and the inside diameter of the other of said ring members having lengths such that when said rings are deformed, crescent-shaped openings are formed between said rings at opposite sides thereof to define entrance and exit slits for passage therethrough of radiant energy.

16. In a device for use with an optical instrument having slit structure adjustable for regulating the width of a slit to control passage of radiant energy therethrough the combination of at least one deformable elastic ring, and micrometer means engaging said ring to change the length of one diameter thereof relative to its original length for varying the width of said slit.

17. In a device for use with an optical instrument having slit structure adjustable for regulating the width of a slit to control passage of radiant energy therethrough, the combination of deformable elastic rings having major and minor axes, and micrometer means for deforming said rings to change the length of the major axis thereof relative to the minor axis thereof for varying the slit width.

References Cited in the file of this patent

UNITED STATES PATENTS

| | | |
|---|---|---|
| 2,594,334 | Miller | Apr. 29, 1952 |
| 2,638,811 | Williams | May 19, 1953 |

OTHER REFERENCES

Randall et al.: "A Recording Spectrograph for Far Infra-Red Review of Scientific Instruments," vol. 9, December 1938, pages 404–413. (Copy in Patent Office Library.)

Fastie: "Small Plane Grating Monochromator" and "Image Forming Properties of the Ebert Monochromator," Journal of the Optical Society of America, vol. 42, September 1952, pages 641–651. (Copy in Division 7.)